US012060077B2

United States Patent
Staehlin (10) Patent No.: US 12,060,077 B2
(45) Date of Patent: Aug. 13, 2024

(54) APPARATUS AND METHOD FOR CONFIDENCE EVALUATION FOR MESSAGES RECEIVED FROM TRAFFIC CONTROL DEVICES

(71) Applicant: Continental Automotive Systems, Inc., Auburn Hills, MI (US)

(72) Inventor: Ulrich Staehlin, Oakland Township, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 125 days.

(21) Appl. No.: 17/146,653

(22) Filed: Jan. 12, 2021

(65) Prior Publication Data

US 2022/0219718 A1 Jul. 14, 2022

(51) Int. Cl.
| | |
|---|---|
| *B60W 60/00* | (2020.01) |
| *B62D 15/02* | (2006.01) |
| *G05D 1/00* | (2024.01) |
| *G06V 20/58* | (2022.01) |
| *G08G 1/095* | (2006.01) |
| *H04W 4/40* | (2018.01) |

(52) U.S. Cl.
CPC ......... *B60W 60/001* (2020.02); *B62D 15/021* (2013.01); *G05D 1/0022* (2013.01); *G06V 20/582* (2022.01); *G08G 1/095* (2013.01); *H04W 4/40* (2018.02); *B60W 2420/403* (2013.01)

(58) Field of Classification Search
CPC .. G08G 1/096725; G08G 1/164; G08G 1/163; G08G 1/096783; G08G 1/017; G08V 20/584; H04W 4/08; H04W 40/02; H04W 4/40; H04W 4/38; H04W 28/0268; G06N 3/0454; G06N 20/00; G01S 17/86; G01C 21/32; G06V 20/56; B60T 7/18; H04B 17/104
See application file for complete search history.

(56) References Cited

U.S. PATENT DOCUMENTS

| | | | |
|---|---|---|---|
| 10,157,539 B1* | 12/2018 | Hoover | H04W 4/40 |
| 10,295,363 B1 | 5/2019 | Konrardy et al. | |
| 10,300,894 B2 | 5/2019 | Rawashdeh et al. | |
| 10,458,810 B2 | 10/2019 | Fasola et al. | |
| 2011/0054716 A1 | 3/2011 | Staehlin et al. | |
| 2015/0124096 A1 | 5/2015 | Koravadi | |
| 2018/0257615 A1* | 9/2018 | Rawashdeh | B60T 7/18 |
| 2018/0322782 A1* | 11/2018 | Engel | G08G 1/163 |
| 2019/0294966 A1* | 9/2019 | Khan | G06V 20/56 |
| 2020/0004268 A1* | 1/2020 | Park | G01C 21/32 |
| 2020/0015144 A1* | 1/2020 | Kedalagudde | H04W 40/02 |
| 2020/0126415 A1* | 4/2020 | Lin | G08G 1/017 |
| 2021/0063546 A1* | 3/2021 | Slobodyanyuk | G01S 17/86 |
| 2021/0110709 A1* | 4/2021 | Raviv | G06N 20/00 |
| 2021/0125076 A1* | 4/2021 | Zhang | G06N 3/0454 |
| 2021/0172749 A1* | 6/2021 | Shin | H04W 4/023 |
| 2021/0227468 A1* | 7/2021 | Wu | H04W 4/40 |
| 2022/0046381 A1* | 2/2022 | Ong | G08G 1/164 |
| 2022/0046391 A1* | 2/2022 | Ong | H04W 4/08 |
| 2022/0058943 A1* | 2/2022 | Jeong | H04B 17/104 |
| 2022/0097708 A1* | 3/2022 | Jin | G06V 20/584 |

FOREIGN PATENT DOCUMENTS

| | | | |
|---|---|---|---|
| DE | 102018204500 A1 | 9/2019 | |
| EP | 3293927 A1 * | 3/2018 | H04L 12/14 |
| WO | WO-2017173072 A1 * | 10/2017 | H04L 41/5051 |

OTHER PUBLICATIONS

"SPaT Challenge Webinar Series #6: Deployment and Validation", Jun. 12, 2018, AASHTO, Its America, ITE, https://transportationops.org/spatchallenge, amazonaws.com.
Benedikt Ostermaier et al. "Enhancing the Security of Local DangerWarnings in VANETs—A Simulative Analysis of Voting Schemes", Availability, Reliability and Security in Ternational Conference on, Apr. 1, 2007, pp. 422-431, XP031079614, ISBN: 978-0-7695-2775-8, Section 4.
Jean-Philippe Monteuuis et al. "Attacker model for Connected and Automated Vehicles", CSCS 2018, Sep. 13, 2018, XP055894307, DOI: 10.1145/3273946.3273951.
Florian Doetzer "Security Concepts for Robust and Highly Mobile Ad-hoc Networks", TU Muenchen, Sep. 19, 2007, XP007909582, p. 92.
International Search Report and Written Opinion dated Mar. 7, 2022 from corresponding International patent application No. PCT/US2021/061329.

* cited by examiner

*Primary Examiner* — Yuri Kan (57) ABSTRACT

A confidence score (or measure) that is related to the reliability of signal phase and time (SPAT)-compliant messages received at a vehicle. Vehicle-to-everything (V2X)-compliant messages are received from other vehicles and compared to the SPAT-compliant messages. Behavior of vehicles (as indicated in the V2X-compliant messages) in view of the content of the SPAT-compliant messages is evaluated for consistency and a numeric (or other type of) score or measure assigned to the SPAT-compliant message (indicating reliability of the SPAT message). The score is compared to a threshold and based upon the comparison, a determination can be made as to whether to use the SPAT-compliant message to perform an action.

18 Claims, 4 Drawing Sheets

APPARATUS AND METHOD FOR CONFIDENCE EVALUATION FOR MESSAGES RECEIVED FROM TRAFFIC CONTROL DEVICES

TECHNICAL FIELD

This patent relates to the determination of the confidence in SPAT-compliant messages received from a traffic lights or other traffic control devices.

BACKGROUND

Traffic lights (and potentially other types of traffic control devices) sometimes send signal phase and time (SPAT) messages. Among other things, SPAT messages include the color of the light, how long the color will be displayed, and the next color that will be displayed. A vehicle in the vicinity of the light receives the messages as sent. Various actions are performed at the vehicle (including controlling components of the vehicle) based upon the SPAT messages.

However, sometimes the sender of the messages may include incorrect information or the information may be unreliable in other respects. The inclusion of incorrect information may be intentional or unintentional. When the information is incorrect or otherwise unreliable, the actions performed by the vehicle may not optimal. When the information has been intentionally changed and in some situations, the results may be dangerous.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The approaches described herein determine a confidence score (or measure) that is related to the reliability of signal phase and time (SPAT)-compliant messages received at a vehicle or other V2X communication participant. Vehicle-to-everything (V2X)-compliant messages are received from other vehicles and compared to the SPAT-compliant messages. For example, behavior of vehicles (as indicated in the V2X-compliant messages) in view of the content of the SPAT-compliant messages is evaluated for consistency and a numeric (or other type of) score or measure assigned to the SPAT-compliant message (indicating reliability of the SPAT message). The score is compared to a threshold and based upon the comparison, a determination can be made as to whether to use the SPAT-compliant message to perform an action (e.g., control a component of the vehicle).

Advantageously and in aspects, the present approaches rely only upon a comparison of electronically transmitted information (from, for example, a traffic lights and other vehicles) and not upon an evaluation of visual images of the traffic light. Effectively, a correlation between this information (the V2X and SPAT-compliant messages) is performed and a score reflecting the degree or extent of correlation is determined. Based upon the score, various actions can be taken (or not taken). The approaches are quick to perform and reliable. Unneeded processing and overhead (e.g., image processing of images of traffic lights) is not required.

As used herein, SPAT-compliant and V2X-compliant messages refer to messages or other communications that follow any version of the SPAT and V2X protocols. However, these terms also cover messages that are effectively compliant with these protocols even if the protocol is not completely followed. That is, minor or insubstantial changes to standard SPAT and V2X protocol messages (e.g., rearrangement of information, dropping of some information from the messages) are also covered in the approaches that are described herein.

In many of these embodiments, at a vehicle, a signal phase and time (SPAT)-compliant message is received from a traffic light (or other traffic control device), and the SPAT-compliant message indicates operational information concerning the traffic light. V2X-compliant messages are also received from a plurality of vehicles in the immediate vicinity of the traffic light.

Contents of the SPAT-compliant message are compared to contents of the V2X-compliant messages. Based upon the comparing, a confidence level, score, or other measure indicating whether the contents of the SPAT-compliant message are reliable, correct, and/or accurate is determined.

The confidence level is compared to a predetermined threshold. When the confidence level is below the predetermined threshold, a first action is prevented (or blocked) from being taken at the vehicle. When the confidence level is above the predetermined threshold, a second action at the vehicle is performed. The first action controls the operation of first components of the vehicle and the second action controls second components of the vehicle. The first action and the second action may be the same or different.

In aspects, the operational information of the SPAT-compliant message comprises a current color of the traffic light, how long the traffic light will present the current color, and a next color of the traffic light. Other examples are possible.

In other aspects, the first action and second action control braking components of the vehicle, control engine components of the vehicle, control steering components of the vehicle, or send instructions via a communication network. Other examples of actions are possible.

In examples, comparing the contents of the SPAT-compliant message to the contents of the V2X-compliant messages comprises determining whether one or more of movement, speed, acceleration, or location of the plurality of vehicles is consistent with contents of the SPAT-compliant message. In still other examples, comparing the contents of the SPAT message to the contents of the V2X-compliant messages comprises evaluating one or more of the movement of the plurality of vehicles, the acceleration of the plurality of vehicles, the position of the plurality of vehicles, or the speed of the plurality of vehicles.

In other examples, the vehicle is an automated vehicle or a semi-automated vehicle. Other examples of vehicles are possible.

In others of these embodiments, a system is disposed at a vehicle and includes a receiver and a control circuit.

The receiver is configured to receive a signal phase and time (SPAT)-compliant message from a traffic light. The SPAT-compliant message indicates operational information concerning the traffic light. The receiver is also configured to receive V2X-compliant messages from a plurality of vehicles in the immediate vicinity of the traffic light.

The control circuit is configured to compare contents of the SPAT-compliant message to contents of the V2X-compliant messages, and based upon the comparing determine a confidence level that the contents of the SPAT-compliant message are reliable, correct, and/or accurate. The control circuit is configured to compare the confidence level to a predetermined threshold. The control circuit is configured to, when the confidence level is below the predetermined threshold, prevent a first action from being taken at the vehicle. The control circuit is configured to, when the confidence level is above the predetermined threshold, perform a second action at the vehicle. The first action controls the operation of first components of the vehicle and the second action controls second components of the vehicle. The first and second actions may be the same or different.

In still other examples, a computer readable non-transitory medium has a computer readable program code embodied therein, the computer readable program code adapted to be executed to implement a method. The method is performed at a vehicle and includes: receiving a signal phase and time (SPAT)-compliant message from a traffic light, wherein the SPAT-compliant message indicates operational information concerning the traffic light; receiving V2X-compliant messages from a plurality of vehicles in the immediate vicinity of the traffic light; comparing contents of the SPAT-compliant message to contents of the V2X-compliant messages, and based upon the comparing determining a confidence level that the contents of the SPAT-compliant message are reliable, correct and/or accurate; and comparing the confidence level to a predetermined threshold.

The method further includes when the confidence level is below the predetermined threshold, preventing a first action from being taken at the vehicle; and when the confidence level is above the predetermined threshold, performing a second action at the vehicle. The first action controls the operation of first components of the vehicle and the second action controls second components of the vehicle. The first and second actions may be the same different.

Figure 1:
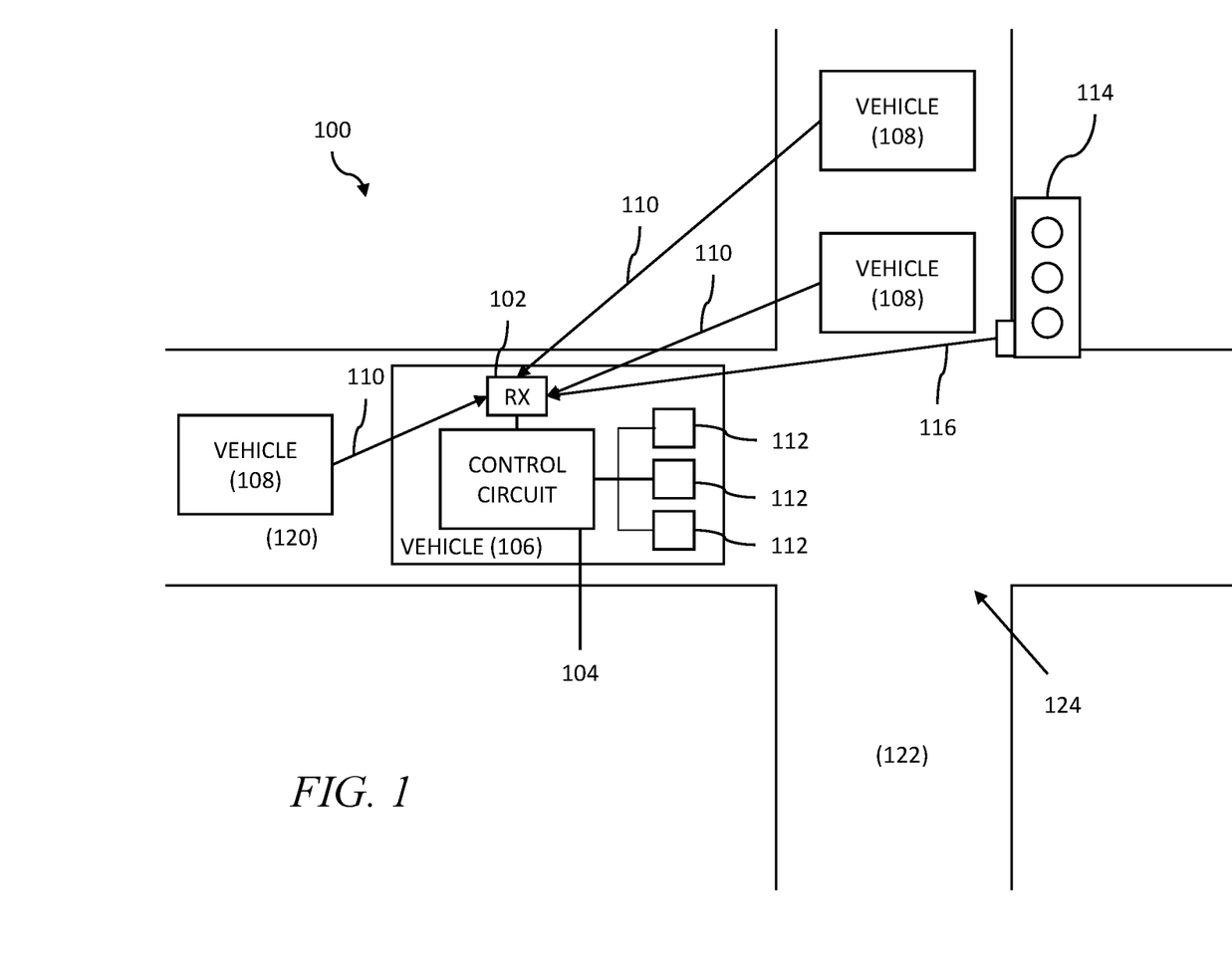
FIG. 1 comprises a diagram of a system according to various embodiments of the present invention.

Referring now to FIG. 1, a system 100 includes a receiver 102 and a control circuit 104. The receiver 102 and the control circuit 104 are disposed in a vehicle 106. Other vehicles 108 transmit V2X-compliant messages 110 that are received at the receiver 102. The control circuit 104 couples to the receiver 102. The control circuit 104 also couples to vehicle modules 112, which as explained elsewhere herein, may in aspects control aspects of operation of the vehicle 106. A traffic control device (e.g., a traffic light) 114 transmits SPAT-compliant messages 116 that are received at the receiver 102. The vehicle 106 and other vehicles 108 operate and maneuver over roads 120 and 122, which converge at an intersection 124. The traffic control device 114 is deployed at the intersection 124 in any appropriate structure (e.g., by poles, wires, brackets, to mention a few examples).

The receiver 102 is any type of receiving device that is configured to receive any type of electronic transmission or communication. That is, the receiver 102 is configured to receive transmitted communications in different frequencies, power levels, and having various other parameters. More specifically, the receiver 102 is configured to receive V2X-compliant messages 110 from a plurality of vehicles 108 in the immediate vicinity of the traffic control device (e.g., traffic light) 114. The V2X-compliant messages 110 describe operational, locational, and/or positional information (e.g., position, direction, speed, and acceleration) concerning the vehicles 108. The receiver 102 is also configured to receive a signal phase and time (SPAT)-compliant message 116 from a traffic light. The SPAT-compliant message indicates operational information concerning the traffic light 114. The receiver 102 receives these messages, and may convert the messages from one format to another or may provide other processing of the received messages. The receiver 102 comprises any combination of electronic/hardware or computer software to implement these functions.

In other examples, the receiver 102 is a transmitter as well as a receiver and is configured to transmit messages from the vehicle 106. In still other examples, a separate transmitter is used to transmit messages and other communications from the vehicle 106. Transmitted messages may indicate the status of the vehicle and may also include V2X messages formed by the control circuit 104 and sent to the other vehicles 108.

The vehicle 106 is any type of vehicle. For example, the vehicle 106 may be a fully automated vehicle (e.g., all driving functions are performed automatically), a partially automated vehicle (e.g., some driving functions are performed automatically), or a manually controlled vehicle (e.g., no driving functions are performed automatically). The vehicle 106 may be a passenger car, a truck, a ship, an aerial drone, an aircraft, or some other type of ground vehicle. Other examples of vehicles are possible. Driving functions include all functionality that controls any function of the vehicle or accessories of the vehicle (e.g., steering, braking, starting, deactivation, etc).

Similarly, the vehicles 108 are also any type of vehicle. For example, the vehicles 108 may be fully automated vehicles (e.g., all driving functions are performed automatically), partially automated vehicles (e.g., some driving functions are performed automatically), or manually controlled vehicles (e.g., no driving functions are performed automatically). The vehicles 108 may be passenger cars, trucks, ships, drones, aircraft, or some other type of ground vehicle. Other examples of vehicles are possible. The vehicles 108 may be a mixture of different types vehicles (e.g., some automated, some not automated, some cars, some trucks, etc.).

The V2X-compliant messages 110 includes messages that follow or are compliant with various V2X protocols. For example, the messages may include the position, direction of travel, speed, acceleration, or other information concerning positional, directional, or operational information concerning the vehicles 108. The messages 110 may also include identification information concerning the vehicles 108.

The SPAT-compliant message 116 follows the SPAT protocol or is compliant with the SPAT protocol. For example, the messages may include the SPAT-compliant message includes information concerning a current color of the traffic light, how long the traffic light will present the current color, and a next color of the traffic light. Other examples are possible.

The vehicle modules (or systems or subsystems) 112 control aspects of vehicle operation, communicate with other systems, or otherwise relate to the operation of the vehicle 106. For example, the vehicle modules 112 may control braking components of the vehicle 106, control engine components of the vehicle 106, control steering components of the vehicle 106, or send instructions via a communication network that is disposed within or outside the vehicle 106 (e.g., where this communication network communicates with other vehicle components or systems). Other examples are possible. In these regards, the control circuit 104 may send electronic control signals to these components, and the components are controlled, operated, and/or configured according to these control signals. For instance, a brake control signal may be sent to actuate the brakes of the vehicle 106. A lighting control signal may be sent to the headlamps of the vehicle 106. An engine control signal may be sent to the engine and this signal controls the speed of the engine. A steering control signals causes the steering system of the vehicle to maneuver the vehicle 106 to different locations and according to various paths. Other examples are possible. It will be appreciated that these actions may cause the vehicle 106 to physically change actions, change states of operation, and interact with the physical environment in which the vehicle 106 operates.

It will be appreciated that the vehicle modules (or systems or subsystems) 112 are collections of components and structures. For example, a braking control module may include the actual brake, mechanical connectors to the brake, wires, and a control circuit (or other processing device) that controls the operation of the brake. In other examples, a lighting control system for a head lamp may include the head lamp and wires to the head lamp (e.g., there may not be the need for a separate control circuit in this subsystem). As mentioned elsewhere herein, some or all of the modules 112 may be coupled to the control circuit 104 by an in-vehicle network, which may be wired or wireless (or combinations of wired and wireless). Other examples and combinations of components and structures are possible.

The traffic control device 114 is any type of traffic control device such as a traffic light. The traffic control device 114 includes a transmitter that transmits the SPAT-compliant messages 116 to the vehicle 106 (and all other vehicles in the vicinity of the traffic control device 114. The traffic control device 114 may include a control circuit (or other processing device) to assemble the SPAT messages (from operational information concerning the traffic control device 114 such as color of the light). The traffic control device 114 may include lamps, lenses, lights, or other structures that display traffic control information to motorists (e.g., the traffic control device 114 may be a standard traffic light).

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 104 may be configured (for example, by using corresponding programming stored in a memory as will be well understood by those skilled in the art) to carry out one or more of the steps, actions, and/or functions described herein. The control circuit 104 may include a memory that includes computer instructions that implement any of the functions described herein.

The control circuit 104 receives the SPAT-compliant message 116 and the V2X-compliant messages 110. The control circuit 110 processes and/or analyzes these messages according to approaches known to those skilled in the art to determine the informational content of the messages. The control circuit 104 is then configured to compare contents of the SPAT-compliant message 116 to contents of the V2X-compliant messages 110, and based upon the results of the comparing, determine a confidence level that the contents of the SPAT-compliant message are correct. The confidence level may be a number (e.g., integer or real number) or any other indicator of a confidence. As mentioned, the confidence level represents an estimation of certainty or confidence that the SPAT-compliant message is correct, reliable, or accurate. In aspects, this represents one or more of confidence that the traffic control device 114 has included correct information in the message 116 or that a nefarious actor has not corrupted, changed, highjacked, or mimicked the message 116.

The control circuit 104 is configured to compare the confidence level to a predetermined threshold. The predetermined threshold may be set by a user and may be estimated based upon previous historical information and evaluation of the information. For example, if the confidence level is on a scale of 0 to 10, a threshold of 9 may be used when it is determined that few traffic problems (e.g., accidents) would be likely to occur above that level, but a significant number of issues may occur below that level.

The control circuit 104 is configured to, when the confidence level is below the predetermined threshold, prevent a first action from being taken at the vehicle. Preventing an action may involve sending instructions to a vehicle component to block the component (e.g., turn off or deactivate the component) or may involve not sending instructions at all (e.g., allowing the component to operate according to its current state or according to a current set of instructions). Other examples of blocking or preventing actions are possible.

The control circuit 104 is configured to, when the confidence level is above the predetermined threshold, perform a second action at the vehicle 106.

As mentioned, the first action controls the operation of first components of the vehicle 106 and the second action controls second components of the vehicle 106. The components may be the same or different. To take one example, the first action may be the activation of the brakes of the vehicle 106 and the second action may be the activation of brakes of the vehicle 106. In another example, the first action may be the activation of the brakes of the vehicle 106 and the second action may be the deactivation of brakes of the vehicle 106. In yet another example, the first action may be the activation of the brakes of the vehicle 106 and the second action may be the activation of the head lights of the vehicle 106. Other examples and combinations of actions are possible.

In yet other examples, the first action and second action control braking components of the vehicle 106, control engine components of the vehicle 106, control steering components of the vehicle 106, or send instructions via a communication network. The communication network may be a controller area network (CAN) or ethernet to mention two examples. The network can be deployed in the vehicle

106 and the network may be coupled directly to other vehicle components. Other examples of networks and couplings are possible.

In examples, comparing the contents of the SPAT-compliant message 116 to the contents of the V2X-compliant messages 110 by the control circuit 104 comprises determining whether one or more of movement, speed, acceleration, or location of the plurality of the vehicles 108 is consistent with contents of the SPAT-compliant message 116. In still other examples, comparing the contents of the SPAT-compliant message 116 to the contents of the V2X-compliant messages 110 by the control circuit 104 comprises evaluating one or more of the movement of the plurality of vehicles 108, the acceleration of the plurality of vehicles 108, the position of the plurality of vehicles 108, or the speed of the plurality of vehicles 108.

It will be appreciated that the other vehicles 108 may include the same or similar structures (e.g., control circuit 104, receiver 102, and vehicle modules 112) as the vehicle 106. Consequently, the operations as performed at the vehicles 108 may be the same as those described herein as occurring at the vehicle 106. In addition, the vehicle 106 may transmit V2X messages to the other vehicles 108. In another aspect, the intersection 124 could be a signalized crossing of a street with a (pedestrian) walkway and the plurality of vehicles could be a combination of vehicles and pedestrians or other traffic participants using the walkway. The intersection and walkway could also be combined.

Figure 2:
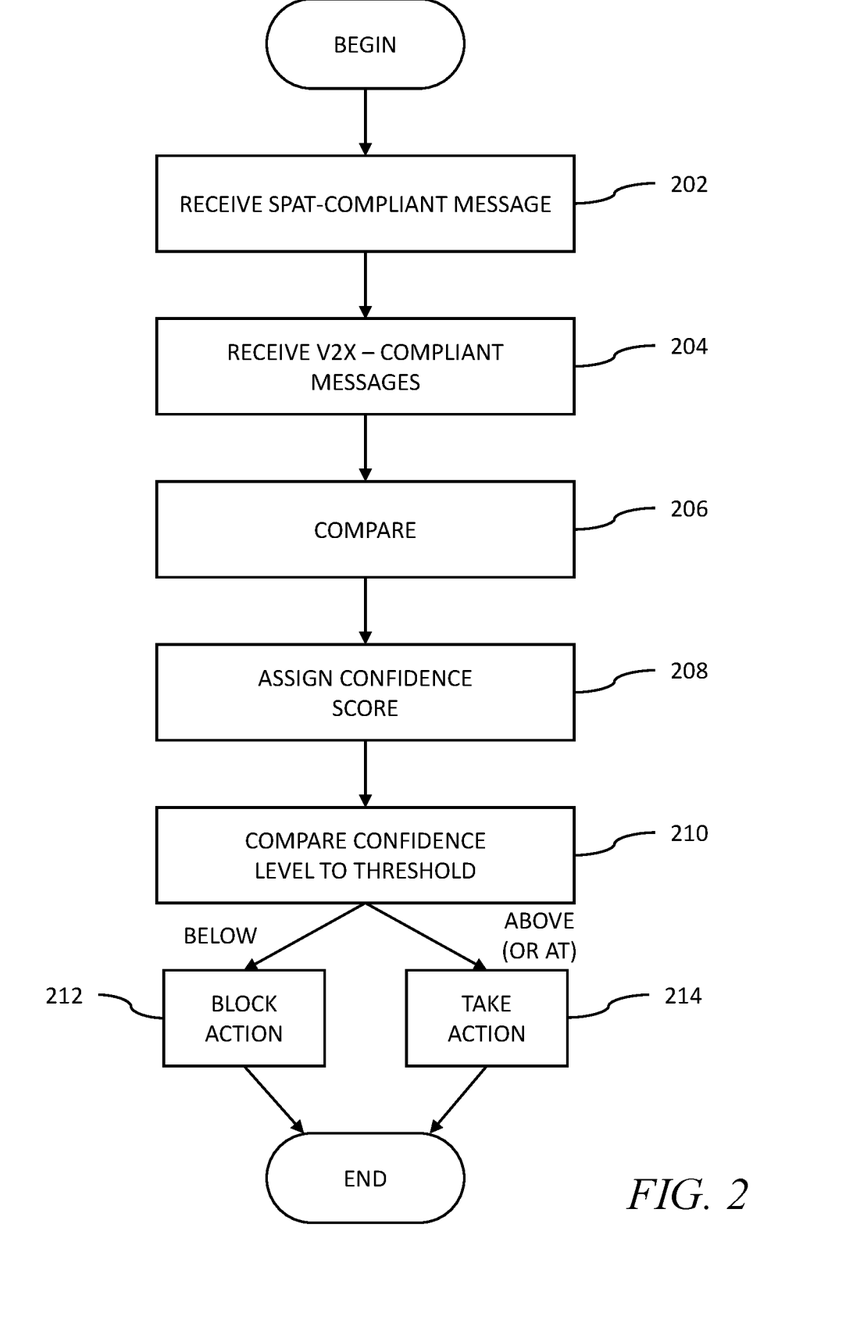
FIG. 2 comprises a flowchart of an approach according to various embodiments of the present invention.

Referring now to FIG. 2, one example of an approach for determining the confidence of SPAT-compliant messages is described.

At step 202 and at a vehicle, a signal phase and time (SPAT)-compliant message is received from a traffic light (or other traffic control device). The SPAT-compliant message indicates operational information concerning the traffic light. In aspects, the operational information may include the current color of the light, the next color of the light, identification of the light, position of the light, and duration of the color of the light, e.g., how long the current color will be displayed. Other types of operational information may also be received.

At step 204 and at the vehicle, V2X-compliant messages are received from a plurality of vehicles in the immediate vicinity of the traffic light. The V2X-compliant messages, in aspects, may include the position, speed, direction of travel, bearing, acceleration, identity, or other characteristics of the vehicle or traffic participants detected by the vehicle. Other examples are possible. Examples of V2X-compliant messages could be a Basic Safety Message (BSM), a Cooperative Awareness Message (CAM), a Decentralized Environmental Notification Message (DENM), and/or Cooperative Perception Message (CPM), to mention a few examples.

At step 206 and at the vehicle, contents of the SPAT-compliant message are compared to contents of the V2X-compliant messages. The contents are first extracted and a comparison is made to determine if the informational contents of one are consistent with the informational content of another. To take one example, V2X-compliant messages from other vehicles may indicate that the positions of vehicles are in the vicinity of an intersection with a traffic light. Also, the V2X-compliant messages may indicate these vehicles are stopped. On the other hand, the SPAT-compliant messages may indicate that the light is red. Consequently, it can be determined that the SPAT-compliant messages and the V2X messages from the other vehicles are consistent with each other (i.e., stopped vehicles may indicate a red light) and that the SPAT-compliant message may be deemed as being reliable.

To take another example, V2X messages from other vehicles may indicate that the positions of vehicles are in the vicinity of an intersection with a traffic light. The V2X messages may indicate these vehicles are stopped. On the other hand, the SPAT-compliant messages may indicate that the light is green and has been green for a long time, e.g., long enough for traffic to move. Consequently, it can be determined that the SPAT-compliant messages and the V2X messages from the other vehicles are not consistent and that the SPAT-message may be unreliable because stopped vehicles are not likely consistent with a long, green light.

At step 208 and at the vehicle, based upon the comparing, a confidence level, score, or measure that the contents of the SPAT-compliant message are reliable, correct, or accurate is determined. When a high confidence is determined, a high score (e.g., 9 out of 10) may be assigned while when a low level of confidence is determined a low score (e.g., 2 out of 10) may be assigned. It will be appreciated that multiple factors may be used to determine the score. For example, consistency between the color and the speed of a vehicle may be used. In other examples, consistency between a plurality of vehicles and a traffic light transmitted SPAT-compliant system is determined. In still another example, the number of consistent V2X messages is examined. For example, when the traffic light indicates red and 24 out of 25 vehicles in the vicinity indicate that they are stopped, and the other vehicle is moving, it can still be determined that the SPAT-compliant message is reliable and a high confidence score assigned.

It will be appreciated that the comparing may involve comparing between different aspects of the SPAT-compliant message and different aspects of the V2X-compliant messages. In aspects, this may involve assembling a weighted average of the outcomes of various comparisons into a confidence score.

At step 210, the confidence level is compared to a predetermined threshold.

At step 212 and when the confidence level is below the predetermined threshold, a first action is prevented (or blocked) from being taken at the vehicle. Blocking may involve not taking any action, but also might involve sending messages or control signals to components that prevent a component from taking some action.

At step 214, and when the confidence level is above the predetermined threshold, a second action at the vehicle is performed.

In aspects, the first action controls the operation of first components of the vehicle and the second action controls second components of the vehicle. The first action and the second action may be the same or different.

Figure 3:
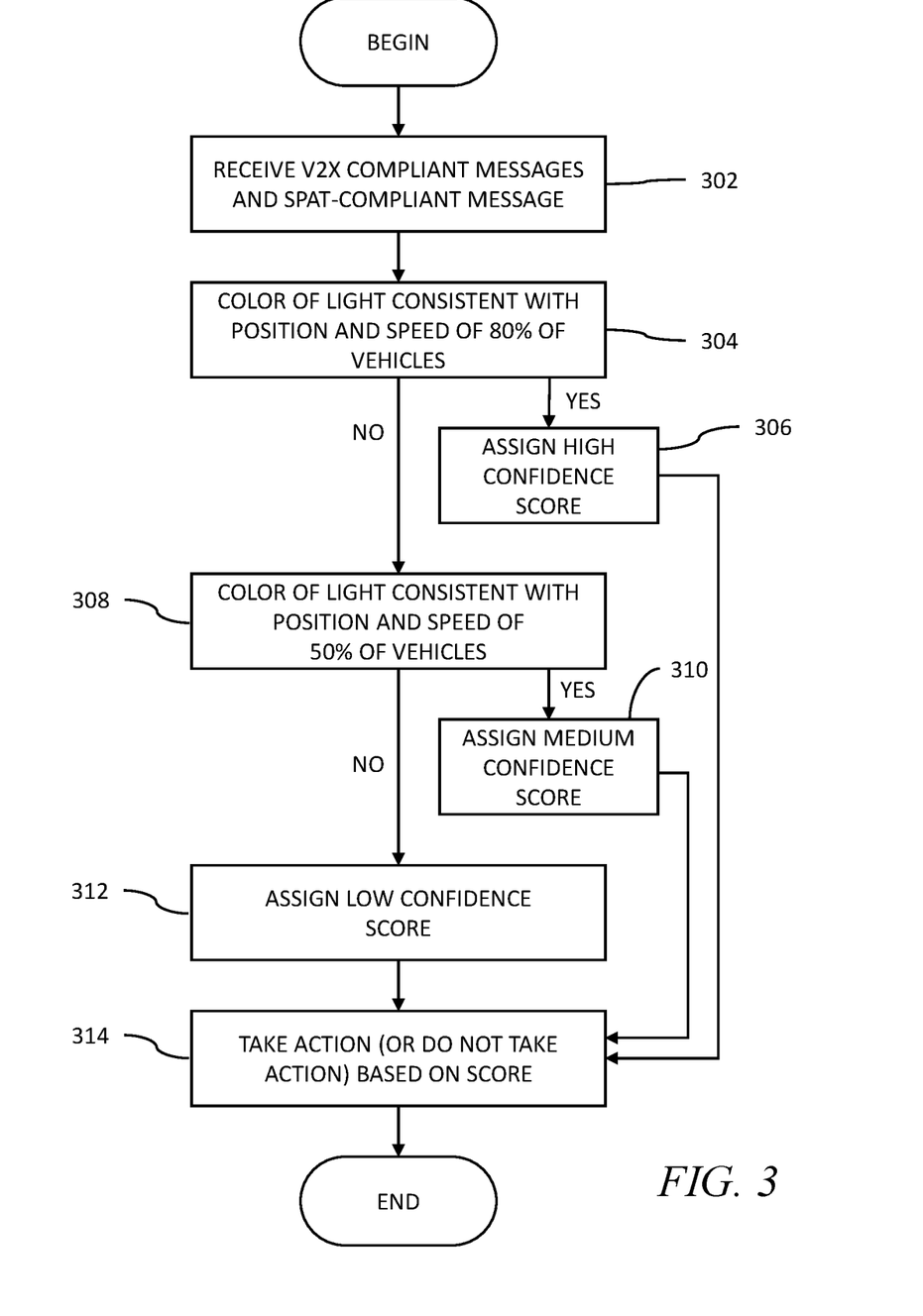
FIG. 3 comprises diagram illustrating aspects of the operation of the approaches described herein according to various embodiments of the present invention.

Referring now to FIG. 3, one example of an approach for comparing SPAT-compliant messages and V2X-compliant messages to determine a confidence level is described. It will be appreciated that this approach is only one example and that other examples are possible. The approach may be, in one example, implemented as computer instructions executed on a processing device (e.g., control circuit 104 as described in FIG. 1).

At step 302, the V2X-compliant messages and the SPAT-compliant messages are received at a vehicle (e.g., the vehicle 106 as described in FIG. 1). After receipt, the message contents are extracted. The color of the traffic light, duration of the color, and the next color are extracted from the SPAT-compliant message. The position, speed, and acceleration are extracted from each V2X-compliant message from each of the other vehicles.

At step 304, it is determined if the color of the traffic light is consistent with the position and speed of 80% of the other vehicles. To take one example, V2X-compliant messages are received from 10 vehicles, and the speeds of 9 out of 10 are 0 mph and one is 5 mph. The SPAT-compliant message is received and indicates the traffic light is red. Consequently, the color of the traffic light (red) is consistent with 90% of the vehicles (showing the vehicles are stopped).

If the answer at step 304 is affirmative, then a high confidence score (e.g., 9) is assigned at step 306.

If the answer is negative, then at step 308 a determination is made if the color of the traffic light is consistent with the position and speed of 50% of the other vehicles. If the answer is affirmative at step 308, then a medium confidence score (e.g., 6) is assigned at step 310.

If the answer is negative at step 308, at step 312, then a low confidence score (e.g., 2) is assigned.

At step 314, an action can be instigated based on the confidence score being above (or at) a threshold, e.g., sending control signal to a vehicle system or component to actuate or deactivate the component.

Figure 4:
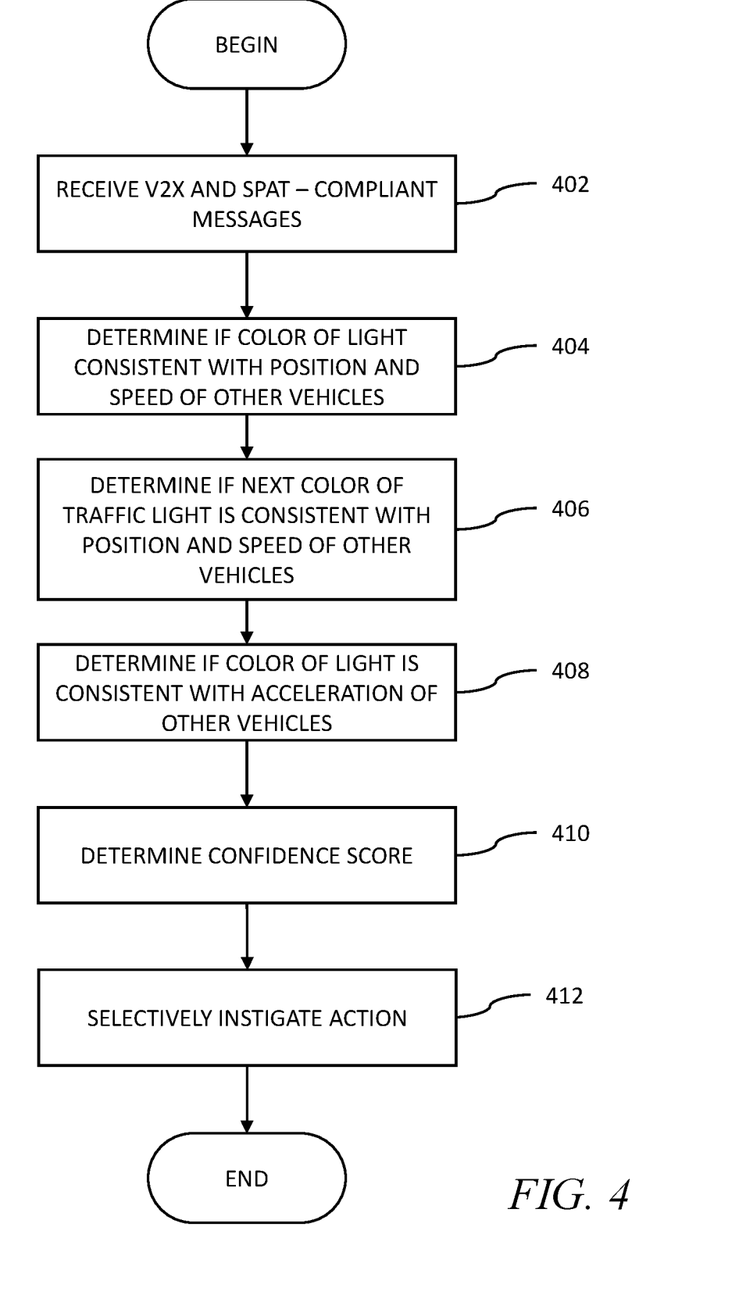
FIG. 4 comprises diagram illustrating aspects of the operation of the approaches described herein according to various embodiments of the present invention.

Referring now to FIG. 4, one example of using different and multiple comparisons to determine a confidence score is described. As with the example of FIG. 3, it will be appreciated that this approach is only one example and that other examples are possible. The approach may be, in one example, implemented as computer instructions executed on a processing device (e.g., control circuit 104 as described in FIG. 1).

At step 402, the V2X-compliant messages and the SPAT-compliant messages are received at a vehicle (e.g., the vehicle 106 as described in FIG. 1). After receipt, the message contents are extracted. The color of the traffic light, duration of the color, and the next color are extracted from the SPAT-compliant message. The position, speed, and acceleration are extracted from the each V2X-compliant message for each of the other vehicles.

At step 404, it is determined if the color of the traffic light is consistent with the position and speed of the other vehicles. To take one example, V2X-compliant messages are received from 10 vehicles and all are in the vicinity (e.g., within 100 feet) of the traffic light, and the speeds of 9 out of 10 are 0 mph and one is 5 mph. The SPAT-compliant message is received and indicates the traffic light is red. Consequently, the color of the traffic light (red) is consistent with 90% of the vehicles (showing the vehicles are completely stopped).

At step 406, it is determined if the next color of the traffic light is consistent with the position and speed of the other vehicles. To take one example, V2X-compliant messages are received from 10 vehicles and all are in the vicinity (e.g., with 100 feet) of the traffic light, and the speeds of 9 out of 10 are 0 mph and one is 5 mph. The SPAT-compliant message is received and indicates the next traffic light color is green. Consequently, the next color of the traffic light (green) is consistent with 90% of the vehicles (showing the vehicles are stopped).

At step 408, it is determined if the color of the traffic light is consistent with the acceleration (or deceleration) of the other vehicles. To take one example, V2X-compliant messages are received from 10 vehicles, and the accelerations of 9 out of 10 are 0 and that one vehicle indicates a small deceleration. The SPAT-compliant message is received and indicates the traffic light color is red. Consequently, the color of the traffic light (red) is consistent with 100% of the vehicles (showing that 9 out of 10 vehicles are stopped because of the red light or are in the process of stopping, i.e., decelerating, in reaction to the red light).

At step 410, the results of steps 402, 404, and 406 are analyzed and a confidence score or measure determined. Different weights can be assigned to the results of each step (e.g., step 402 may have a higher weight than the other steps). In other examples, if all steps 402, 404, and 406 show consistent results (e.g., the traffic light is red and the other vehicles are stopped or stopping), then a high confidence score is assigned. If two out of three steps 402, 404, and 406 show consistent results (e.g., the traffic light is red and some of the other vehicles are stopped or stopping), then a medium confidence score is assigned. If no steps 402, 404, and 406 show consistent results (e.g., the traffic light is red and few (or none) of the other vehicles are stopped or are stopping), then a low confidence score is assigned. If weighted values are used, then a particular weight can be assigned to each step. For example, if step 402 is assigned a weight of 0.85, and step 404 a weight of 0.1, and step 402 a weight of 0.05, and steps 402 and 404 show consistent results while step 406 does not, then the confidence score may be calculated as: 0.85+0.1+0=0.95.

At step 412, an action can be instigated or taken based on the confidence score being above (or at) a threshold, e.g., sending control signal to a vehicle system or component to actuate or deactivate the component.

It should be understood that any of the devices described herein (e.g., the control circuits, the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method, the method comprising:
at a vehicle:
receiving a signal phase and time (SPAT)-compliant message from a traffic light, wherein the SPAT-compliant message indicates operational information concerning the traffic light;
receiving V2X-compliant messages from a plurality of vehicles in an immediate vicinity of the traffic light;
comparing contents of the SPAT-compliant message to contents of the V2X-compliant messages, and based upon the comparing determining a confidence level that the contents of the SPAT-compliant message are correct;
comparing the confidence level to a predetermined threshold,
when the confidence level is below the predetermined threshold, preventing a first action from being taken at the vehicle;
when the confidence level is above the predetermined threshold, performing a second action at the vehicle;
wherein the first action controls the operation of first components of the vehicle and the second action controls second components of the vehicle.

2. The method of claim 1, wherein the operational information of the SPAT-compliant message comprises a current color of the traffic light, how long the traffic light will present the current color, and a next color of the traffic light.

3. The method of claim 1, wherein the first action and second action control braking components of the vehicle, control engine components of the vehicle, control steering components of the vehicle, or send instructions via a communication network.

4. The method of claim 1, wherein comparing the contents of the SPAT-compliant message to the contents of the V2X-compliant messages comprises determining whether one or more of movement, speed, acceleration, or location of the plurality of vehicles is consistent with contents of the SPAT-compliant message.

5. The method of claim 1, wherein the vehicle is an automated vehicle or a semi-automated vehicle.

6. The method of claim 1, wherein comparing the contents of the SPAT message to the contents of the V2X-compliant messages comprises evaluating one or more of the movement of the plurality of vehicles, the acceleration of the plurality of vehicles, the position of the plurality of vehicles, or the speed of the plurality of vehicles.

7. A system, the system being disposed at a vehicle, the system comprising:
a receiver, the receiver configured to receive a signal phase and time (SPAT)-compliant message from a traffic light, wherein the SPAT-compliant message indicates operational information concerning the traffic light, the receiver also configured to receiving V2X-compliant messages from a plurality of vehicles in an immediate vicinity of the traffic light;
a control circuit, the control circuit configured to:
compare contents of the SPAT-compliant message to contents of the V2X-compliant messages, and based upon the comparing determining a confidence level that the contents of the SPAT-compliant message are correct;
compare the confidence level to a predetermined threshold,
when the confidence level is below the predetermined threshold, prevent a first action from being taken at the vehicle;
when the confidence level is above the predetermined threshold, perform a second action at the vehicle;
wherein the first action controls the operation of first components of the vehicle and the second action controls second components of the vehicle.

8. The system of claim 7, wherein the operational information of the SPAT-compliant message comprises a current color of the traffic light, how long the traffic light will present the current color, and a next color of the traffic light.

9. The system of claim 7, wherein the first action and second action control braking components of the vehicle, control engine components of the vehicle, control steering components of the vehicle, or send instructions via a communication network.

10. The system of claim 7, wherein comparing the contents of the SPAT-compliant message to the contents of the V2X-compliant messages comprises determining whether one or more of movement, speed, acceleration, or location of the plurality of vehicles is consistent with contents of the SPAT-compliant message.

11. The system of claim 7, wherein the vehicle is an automated vehicle or a semi-automated vehicle.

12. The system of claim 7, wherein comparing the contents of the SPAT message to the contents of the V2X-compliant messages comprises evaluating one or more of the movement of the plurality of vehicles, the acceleration of the plurality of vehicles, the position of the plurality of vehicles, or the speed of the plurality of vehicles.

13. A computer readable non-transitory medium having a computer readable program code embodied therein, the computer readable program code adapted to be executed to implement a method, the method comprising:
at a vehicle:
receiving a signal phase and time (SPAT)-compliant message from a traffic light, wherein the SPAT-compliant message indicates operational information concerning the traffic light;
receiving V2X-compliant messages from a plurality of vehicles in an immediate vicinity of the traffic light;
comparing contents of the SPAT-compliant message to contents of the V2X-compliant messages, and based upon the comparing determining a confidence level that the contents of the SPAT-compliant message are correct;
comparing the confidence level to a predetermined threshold,
when the confidence level is below the predetermined threshold, preventing a first action from being taken at the vehicle;
when the confidence level is above the predetermined threshold, performing a second action at the vehicle;

wherein the first action controls the operation of first components of the vehicle and the second action controls second components of the vehicle.

14. The computer readable medium of claim 13, wherein the operational information of the SPAT-compliant message comprises a current color of the traffic light, how long the traffic light will present the current color, and a next color of the traffic light.

15. The computer readable medium of claim 13, wherein the first action and second action control braking components of the vehicle, control engine components of the vehicle, control steering components of the vehicle, or send instructions via a communication network.

16. The computer readable medium of claim 13, wherein the comparing the contents of the SPAT-compliant message to the contents of the V2X-compliant messages comprises determining whether one or more of movement, speed, acceleration, or location of the plurality of vehicles is consistent with contents of the SPAT-compliant message.

17. The computer readable medium of claim 13, wherein the vehicle is an automated vehicle or a semi-automated vehicle.

18. The computer readable medium of claim 13, wherein the comparing the contents of the SPAT message to the contents of the V2X-compliant messages comprises evaluating one or more of the movement of the plurality of vehicles, the acceleration of the plurality of vehicles, the position of the plurality of vehicles, or the speed of the plurality of vehicles.

* * * * *